Jan. 15, 1952     E. E. LLOYD     2,582,493
AUTOMOBILE TIRE CHAIN

Filed Dec. 12, 1949     2 SHEETS—SHEET 1

INVENTOR,
Eldon E. Lloyd.
BY Roy E. Hamilton.
Attorney.

Jan. 15, 1952      E. E. LLOYD      2,582,493
AUTOMOBILE TIRE CHAIN

Filed Dec. 12, 1949      2 SHEETS—SHEET 2

INVENTOR,
Eldon E. Lloyd.
BY Roy E. Hamilton
Attorney

Patented Jan. 15, 1952

2,582,493

UNITED STATES PATENT OFFICE 2,582,493

AUTOMOBILE TIRE CHAIN

Eldon E. Lloyd, Maryville, Mo.

Application December 12, 1949, Serial No. 132,487

6 Claims. (Cl. 152—241)

This invention relates to new and useful improvements in automobile tire chains, and has particular reference to end fasteners for tire chains.

In automobile tire chains of the type comprising a pair of rim chains each forming an endless loop concentric with the tire and disposed respectively at the opposite faces of said tire, and a plurality of cross chains extending transversely between said rim chains across the tread face of said tire, it is of course necessary that said rim chains be broken at one point, in order that the chains may be applied to the tire. Various fasteners have been proposed for securing together the ends of said rim chains to secure the chains on the tire, but in all such fasteners within my knowledge great inconvenience is experienced in fastening together the ends of the inner rim chain, since that fastener is ordinarily out of sight and relatively inaccessible to the operator. The principal object of this invention is the elimination of this difficulty.

Another object is the provision of an automobile tire chain of the class described wherein an extension provided at one end of the inner rim chain is adapted to be threaded through an eye provided at the opposite end of said inner rim chain, then passed around the tire tread and threaded through an eye provided at one end of the outer rim chain, and finally secured to the opposite end of said outer rim chain.

A further object is the provision of a tire chain of the class described wherein that portion of the extension of the inner rim chain which traverses the tire tread is formed to provide a cross chain of any suitable design.

A still further object is the provision, in said rim chain extension, of special links for engaging the rim chain eyes through which said extension is threaded, said special links being self-locking in said eyes whereby operating tension exerted on either the rim chains or the cross chains will not pull said extension through said eyes.

Another object is the provision of stop means whereby said rim chain extension cannot be pulled too far through the rim chain eyes.

Other objects are simplicity and economy of construction, and ease and convenience of operation.

With these objects in view, as well as other objects which will appear in the course of the specification, reference will be had to the drawing, wherein.

Figure 1:
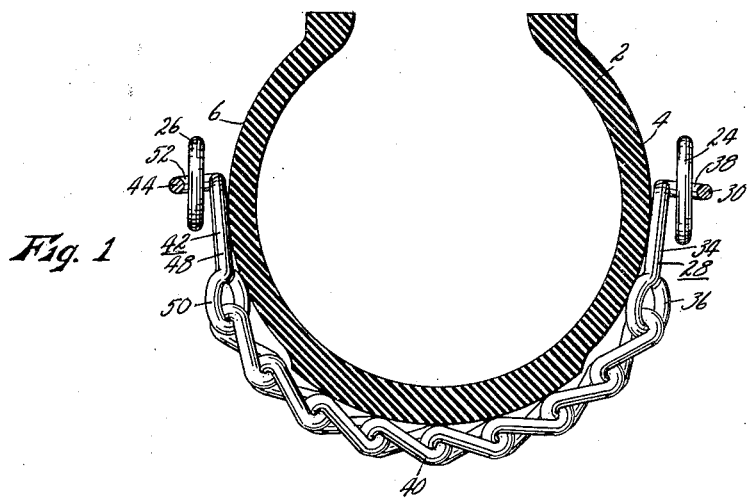
Figure 1 is a sectional view of a tire with a tire chain embodying the present invention mounted thereon, and is taken, with respect to the chain, substantially on line I—I of Fig. 2.
Figure 3:
Fig. 3 is a sectional view taken on line III—III of Fig. 2.

Like reference numerals apply to similar parts throughout the several views, and the numeral 2 applies to a tire casing shown in section. For convenience, the inner face of the tire, or that face toward the centerline of an automobile on which the tire is mounted, is designated by the numeral 4, and the outer face by the numeral 6. The tire chain includes a pair of rim chains 8 and 10, said chains being adapted to be positioned respectively adjacent the inner and outer faces of the tire and to extend therearound substantially concentrically with said tire. The inner rim chain 8 is divided, having end links 12 and 14, and the outer rim chain 10 is also divided, having end links 16 and 18. Cross chains 20 extend transversely between the rim chains at spaced intervals therealong. Said cross chains may have links of any suitable design, and are secured at their ends to corresponding links of the rim chains by suitable connector links 22.

Figure 2:
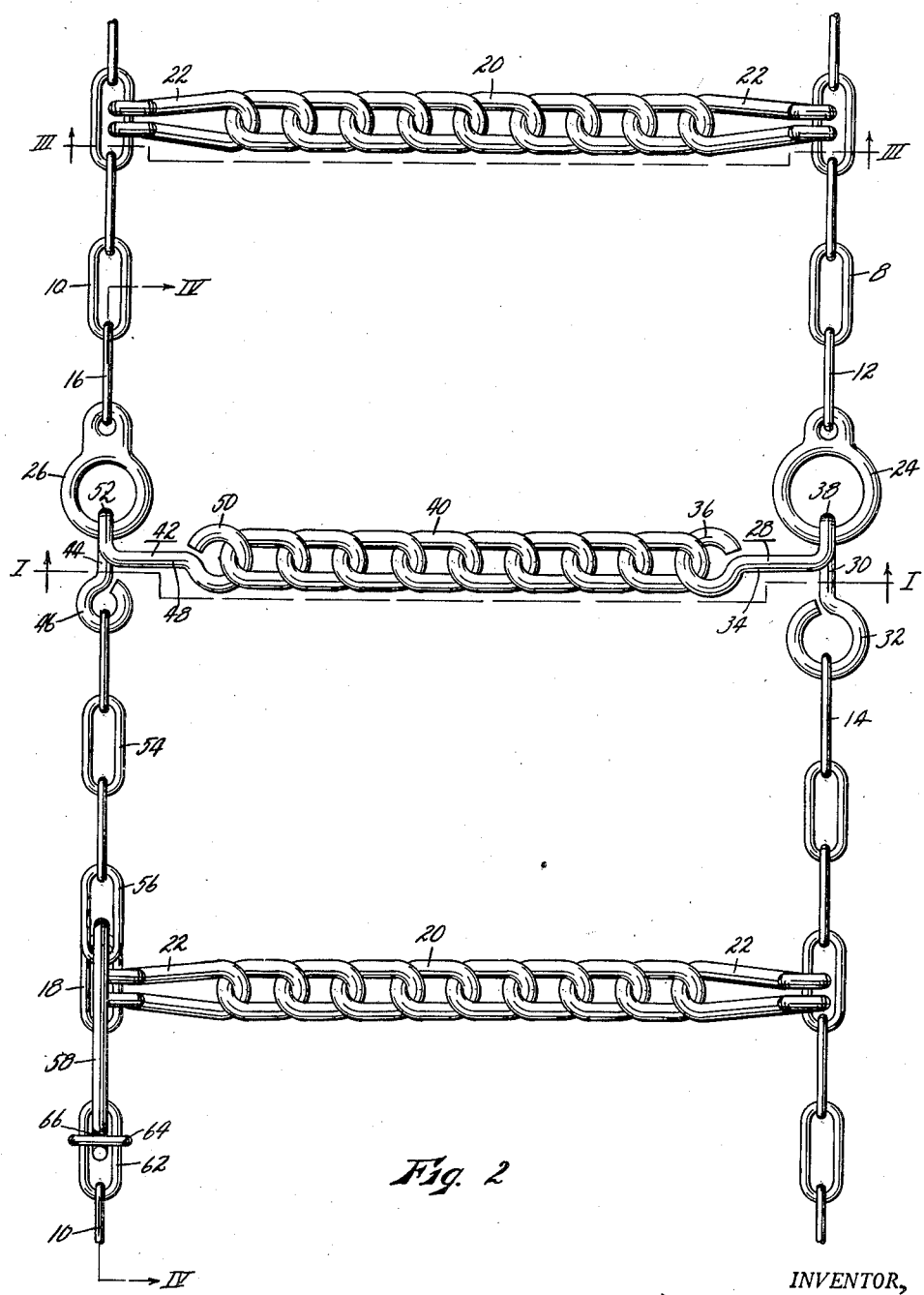
Fig. 2 is a fragmentary stretch-out view of the inner or tire engaging surface of the chain, showing the end connection and adjacent parts.

An eye 24 is interconnected with end link 12 of inner rim chain 8, and a similar eye 26 is interconnected with end link 16 of outer rim chain 10. Interconnected with end link 14 of inner rim chain 8 is a lock link 28. Said lock link is made of a single length of wire and is substantially right-angled, having an arm 30 substantially in line with rim chain 8 with an eye 32 formed at the end thereof for engaging end link 14, and an arm 34 substantially at right angles to arm 30 and having an eye 36 formed at the end thereof. Intermediate its ends, lock link 28 is offset to form a notch 38, said notch extending parallel to arm 30 of said link and opening toward the free end of said arm. Said link is adapted to be positioned in eye 24 as shown in Figs. 1 and 2, said eye engaging notch 38. It will be noted that eye 36 of the link is small enough to pass through eye 24, while eye 32 of the link is too large to pass through eye 24.

Figure 4:
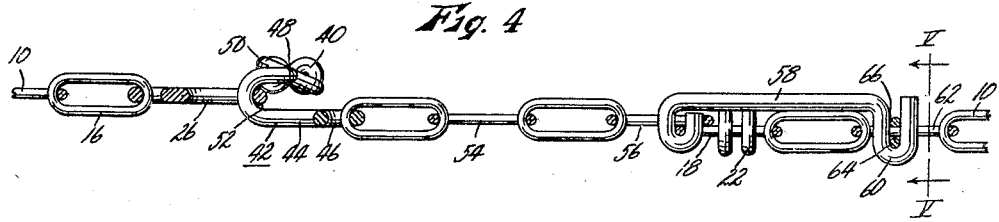
Fig. 4 is a fragmentary sectional view taken on line IV—IV of Fig. 2, with parts left in elevation.
Figure 5:
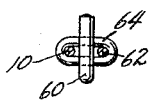
Fig. 5 is a sectional view taken on line V—V of Fig. 4.

Interconnected in eye 36 of lock link 28 is one end of a cross chain 40 similar in all respects to the other cross chains 20. Said cross chain is adapted to pass transversely around the tread of tire 2 as shown in Fig. 1, and is connected at its opposite end with a lock link 42. Said lock link is similar to lock link 28, having an arm 44 substantially in line with rim chain 10 with an eye 46 formed at the end thereof, an arm 48 substantially at right angles to arm 44 and having an eye 50 formed at the end thereof for engaging cross chain 40, and being offset intermediate its ends to form a notch 52 parallel with arm 44 and opening toward the free end thereof. Said lock link is adapted to be positioned in eye 26 as shown in Figs. 1, 2 and 4, eye 26 engaging notch 52. It will be noted that eye 46 of the lock link is small enough to pass through eye 26, while eye 50 of the link is too large.

Secured in eye 46 of lock link 42 is one end of a short length of chain 54 similar to rim chain 10. The opposite end link 56 of chain 54 is adapted to be secured to end link 18 of rim chain 10 by any suitable type of fastener. The fastener shown comprises a lever 58 pivoted at one end to end link 18, said lever being adapted to be inserted through end link 56 of chain 54, and folded back to lie along rim chain 10, as shown in Figs. 2 and 4. At its free end, lever 58 is formed to present an offset 60 adapted to project through a link 62 of chain 10. A wire loop 64 is disposed about link 62, and is longitudinally slidable thereon to be moved into the notch 66 formed in lever 58 by offset 60. The lever is thereby firmly secured in its operative position. It will be noted also that lever 58 is normally disposed between rim chain 10 and the tire, and is thereby further secured against accidental release.

The operation of applying the chain is substantially as follows: After the chain has been positioned about the tire in the usual manner, the extension of rim chain 8 comprising lock link 28, cross chain 40, lock link 42, and chain 54 is threaded through eye 24 in a direction toward the tire. All parts of this extension except eye 32 of lock link 28 will pass freely through eye 24. This is an operation which can be performed easily and rapidly even though the operator cannot see the inner face of the tire. The operator then pulls sharply on chain 54 in a direction toward the outer face of the tire. Lock link 28 will automatically position itself in eye 24 as shown. Said lock link cannot pass entirely through eye 24 since eye 32 thereof is too large. Chain 54 is then passed through eye 26 of the outer rim chain in a direction away from the tire, and pulled sharply, whereby lock link 42 will position itself in said eye as shown, said eye engaging notch 52 of said link. Eye 50 of the link cannot pass through eye 26. End link 56 of chain 54 is then secured to end link 18 of rim chain 10 by means of lever fastener 58. This fastener is adjacent the outer face of the tire, and easily accessible to the operator.

It will be noted that the tensile pull of the rim chains on lock links 28 and 42 is approximately axial relative to the arms 30 and 44 of said links, which are substantially in line with said rim chains, and that hence there is no tendency for said rim chains to pull said links through eyes 24 and 26. The lock links must be turned through at least 90 degrees, as for example about axes either parallel or at right angles to cross chain 40, before they will release from eyes 24 and 26, and this turning is prevented by the relative positioning of cross chain 40 and the rim chains.

To disengage the chain from the tire, fastener 58 is first released, and chain 54 is pulled sharply toward eye 26. This turns lock link 42 so that arm 44 and eye 46 thereof can pass through eye 26. Cross chain 40 is then pulled toward eye 24 to a position substantially in line with rim chain 8. This turns lock link 28 so that arm 34 and eye 36 thereof can pass through eye 24.

Thus it is apparent that an automobile tire chain having several advantages has been produced. It does away with the necessity of making a separate connection to join the ends of the inner rim chain. It is easy and convenient to operate. It is extremely simple and economical.

While I have shown a specific embodiment of my invention, it is apparent that minor changes of construction and operation could be made without departing from the spirit of the invention.

What I claim is:

1. A tire chain comprising spaced-apart inner and outer rim chains, spaced-apart cross chains extending transversely between and secured at their opposite ends to said rim chains, an eye secured to one end of each of said rim chains, a chain extension secured to the opposite end of said inner rim chain and adapted to be threaded successively through the eye of said inner rim chain and the eye of said outer rim chain, said chain extension having a right-angled link contained therein for engaging each of said eyes, each of said links having an arm substantially in line with the adjacent rim chain and an arm extending at right angles thereto, and means for securing said extension to the opposite end of said outer rim chain.

2. A tire chain comprising spaced-apart inner and outer rim chains, spaced-apart cross chains extending transversely between and secured at their opposite ends to said rim chains, an eye secured to one end of each of said rim chains, a chain extension secured to the opposite end of said inner rim chain and adapted to be threaded successively through the eye of said inner rim chain and the eye of said outer rim chain, said chain extension having a right-angled link contained therein for engaging each of said eyes, each of said links having an arm substantially in line with the adjacent rim chain and an arm extending at right angles thereto, each of said links being offset at the juncture of its arms to form a notch parallel to the adjacent rim chain, said notch being adapted to engage the corresponding eye, and means for securing said extension to the opposite end of said outer rim chain.

3. A tire chain comprising spaced-apart inner and outer rim chains, spaced-apart cross chains extending transversely between and secured at their opposite ends to said rim chains, an eye secured to one end of each of said rim chains, a first right-angled link secured to the opposite end of said inner rim chain and adapted to extend through the eye of said inner rim chain, a cross chain secured to said right-angled link and extending transversely to said rim chains, a second right-angled link secured to the opposite end of said cross chain and extending through the eye of said outer rim chain, and means for securing said second right-angled link to the opposite end of said outer rim chain.

4. A tire chain comprising spaced-apart inner and outer rim chains, spaced-apart cross chains extending transversely between and secured at their opposite ends to said rim chains, an eye secured to one end of each of said rim chains, a chain extension secured to the opposite end of said inner rim chain and adapted to be threaded successively through the eye of said inner rim chain and the eye of said outer rim chain, means for securing said extension to the opposite end of said outer rim chain, the portion of said extension disposed between said rim chains comprising a cross chain corresponding to the previously named cross chains, and a lock link contained in said extension for engaging each of the eyes of said rim chains, each of said lock links being offset intermediate its ends to form a notch adapted to engage the corresponding eye.

5. A tire chain comprising spaced-apart inner and outer rim chains, spaced-apart cross chains extending transversely between and secured at their opposite ends to said rim chains, an eye secured to one end of each of said rim chains, a chain extension secured to the opposite end of said inner rim chain and adapted to be threaded successively through the eye of said inner rim chain and the eye of said outer rim chain, means for securing said extension to the opposite end of said outer rim chain, the portion of said extension disposed between said rim chains comprising a cross chain corresponding to the previously named cross chains, and a lock link contained in said extension for engaging each of the eyes of said rim chains, each of said lock links being substantially right-angled, having an arm substantially in line with said cross chain and an arm substantially in line with the corresponding rim chain, and being offset at the juncture of said right-angled arms to form a notch for engaging the corresponding eye, said notch extending parallel to the corresponding rim chain.

6. A tire chain comprising spaced-apart inner and outer rim chains, spaced-apart cross chains extending transversely between and secured at their opposite ends to said rim chains, an eye secured to one end of each of said rim chains, a chain extension secured to the opposite end of said inner rim chain and adapted to be threaded successively through the eye of said inner rim chain and the eye of said outer rim chain, means for securing said extension to the opposite end of said outer rim chain, the portion of said extension disposed between said rim chains comprising a cross chain corresponding to the previously named cross chains, a lock link contained in said extension for engaging each of the eyes of said rim chains, each of said lock links being offset intermediate its ends to form a notch adapted to engage the corresponding eye, and enlargements formed at the trailing end of each of said lock links, the enlargement of the lock link associated with said outer rim chain being smaller than the eye of the inner rim chain but larger than the eye of said outer rim chain, and the enlargement of the lock link associated with the inner rim chain being larger than the eye of said inner rim chain.

ELDON E. LLOYD.

REFERENCES CITED

The following references are of record in the file of this patent:

UNITED STATES PATENTS

| Number | Name | Date |
|---|---|---|
| Re. 23,221 | Fox | Apr. 25, 1950 |
| 1,935,035 | Levi | Nov. 14, 1933 |
| 2,059,100 | Green | Oct. 27, 1936 |
| 2,074,616 | Martel | Mar. 23, 1937 |
| 2,130,293 | Bonforte | Sept. 13, 1938 |